(12) United States Patent  (10) Patent No.: US 8,340,886 B2
Nenmeni et al.  (45) Date of Patent: Dec. 25, 2012

(54) SYSTEM AND METHOD FOR TRANSITIONING BETWEEN FUEL SUPPLIES FOR A COMBUSTION SYSTEM

(75) Inventors: Vijay Raghavendran Nenmeni, Atlanta, GA (US); Michael John Rozdolski, Guilderland, NY (US); Rahul Jaikaran Chillar, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 29 days.

(21) Appl. No.: 13/042,322

(22) Filed: Mar. 7, 2011

(65) Prior Publication Data

US 2012/0232768 A1    Sep. 13, 2012

(51) Int. Cl.
*F02M 33/02* (2006.01)
*F02C 7/22* (2006.01)
*G06F 19/00* (2006.01)

(52) U.S. Cl. .......................... 701/103; 123/520; 60/746
(58) Field of Classification Search .................. 701/103; 123/520; 60/746, 772
See application file for complete search history.

(56) References Cited

U.S. PATENT DOCUMENTS

| | | |
|---|---|---|
| 3,686,859 A | 8/1972 | White |
| 3,878,678 A | 4/1975 | Huellmantel et al. |
| 4,041,695 A | 8/1977 | Harper et al. |
| 4,157,082 A | 6/1979 | Day |
| 4,706,636 A | 11/1987 | Davis |
| 4,711,085 A | 12/1987 | Lyons |
| 4,964,270 A | 10/1990 | Taylor et al. |
| 4,984,424 A | 1/1991 | Shekleton |
| 5,095,694 A | 3/1992 | Shekleton et al. |
| 5,540,045 A | 7/1996 | Corbett et al. |
| 5,573,867 A | 11/1996 | Zafred et al. |
| 5,720,164 A | 2/1998 | Corbett et al. |
| 5,735,117 A | 4/1998 | Toelle |
| 5,881,550 A | 3/1999 | Toelle |
| 5,966,926 A | 10/1999 | Shekleton et al. |
| 6,050,081 A | 4/2000 | Jansen et al. |
| 6,056,004 A | 5/2000 | Agnew |
| 6,125,624 A | 10/2000 | Prociw |
| 6,244,034 B1 | 6/2001 | Taylor et al. |
| 6,282,885 B1 | 9/2001 | Muramatsu et al. |
| 6,385,961 B2 * | 5/2002 | Nakamoto ................ 60/39.094 |
| 6,438,963 B1 | 8/2002 | Traver et al. |
| 6,442,925 B1 | 9/2002 | Dalton et al. |
| 6,449,955 B2 | 9/2002 | Tanaka et al. |
| 6,536,217 B2 | 3/2003 | Lipinski et al. |
| 6,792,760 B2 | 9/2004 | Mathias et al. |
| 6,804,946 B2 | 10/2004 | Willis et al. |
| 6,807,801 B2 | 10/2004 | McCarty |
| 6,810,677 B2 | 11/2004 | Dewis |
| 6,931,831 B2 | 8/2005 | Jansen |
| 7,000,602 B2 | 2/2006 | Cullen et al. |
| 7,296,412 B2 | 11/2007 | Hall et al. |

(Continued)

FOREIGN PATENT DOCUMENTS

EP    1071872    10/2002

(Continued)

*Primary Examiner* — Tan Q Nguyen
(74) *Attorney, Agent, or Firm* — Fletcher Yoder, P.C.

(57) ABSTRACT

A system includes a turbine fuel controller. The turbine fuel controller includes a purge control logic configured to control a purge sequence of mixing a purge gas with a first fuel during a first fuel shutdown, wherein the purge sequence is configured to open a purge valve for the purge gas before fully closing a fuel valve for the first fuel.

20 Claims, 5 Drawing Sheets

U.S. PATENT DOCUMENTS

| | | |
|---|---|---|
| 7,302,933 B2 | 12/2007 | Kerns |
| 7,424,881 B2 | 9/2008 | Kerns |
| 7,530,260 B2 | 5/2009 | Dooley |
| 7,677,025 B2 | 3/2010 | Stuttaford et al. |
| 7,721,702 B2 | 5/2010 | Miller et al. |
| 7,726,112 B2 | 6/2010 | Dooley |
| 2002/0026786 A1* | 3/2002 | Nakamoto ............... 60/39.094 |
| 2002/0073687 A1 | 6/2002 | Lipinski et al. |
| 2003/0056521 A1 | 3/2003 | Dewis |
| 2003/0167773 A1 | 9/2003 | Mathias et al. |
| 2004/0074223 A1 | 4/2004 | Willis et al. |
| 2005/0144958 A1 | 7/2005 | Hall et al. |
| 2005/0160716 A1 | 7/2005 | Jansen |
| 2005/0193741 A1* | 9/2005 | Iasillo et al. ............... 60/776 |
| 2005/0193986 A1 | 9/2005 | Cullen et al. |
| 2005/0244686 A1* | 11/2005 | Kamihara ................. 429/22 |
| 2006/0168966 A1 | 8/2006 | Stuttaford et al. |
| 2006/0283193 A1 | 12/2006 | Nilsson |
| 2007/0119411 A1 | 5/2007 | Kerns |
| 2007/0295307 A1 | 12/2007 | Kerns |
| 2008/0034733 A1 | 2/2008 | Miller et al. |
| 2008/0066450 A1* | 3/2008 | Surnilla et al. ............... 60/285 |
| 2009/0255263 A1 | 10/2009 | Doerr et al. |
| 2010/0107640 A1 | 5/2010 | Smith et al. |
| 2012/0016566 A1* | 1/2012 | Cunningham et al. ........ 701/103 |

FOREIGN PATENT DOCUMENTS

| | | |
|---|---|---|
| EP | 2182263 | 5/2010 |
| JP | 55069731 | 5/1980 |
| JP | 60164627 | 8/1985 |
| WO | WO9005877 | 5/1990 |
| WO | WO9728573 | 8/1997 |
| WO | WO9954610 | 10/1999 |
| WO | WO03018977 | 3/2003 |
| WO | WO2008020935 | 2/2008 |

* cited by examiner

SYSTEM AND METHOD FOR TRANSITIONING BETWEEN FUEL SUPPLIES FOR A COMBUSTION SYSTEM

BACKGROUND OF THE INVENTION

The subject matter disclosed herein relates to combustion systems with multi-fuel systems.

In general, gas turbine engines combust a mixture of compressed air and fuel to produce hot combustion gases. Certain gas turbine engines include multi-fuel systems that use, for example, both gas and liquid fuels, where the multi-fuel system allows the transfer from one fuel to the other. During the transfer from one fuel to another fuel, use of the current fuel is terminated and the current fuel is discarded from the fuel piping system. Discarding the fuel occurs using a purge system that employs gas to displace the current fuel in the fuel piping system. However, certain sequencing of the termination of the current fuel used and the use of the purge system may result in overheating and backflow of combustion products into the fuel piping system resulting in hardware damage.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In accordance with a first embodiment, a system includes a turbine fuel controller. The turbine fuel controller includes a purge control logic configured to control a purge sequence of mixing a purge gas with a first fuel during a first fuel shutdown, wherein the purge sequence is configured to open a purge valve for the purge gas before fully closing a fuel valve for the first fuel.

In accordance with a second embodiment, a system includes a fuel controller. The fuel controller includes a fuel transition logic configured to control a fuel transition from a first fuel to a second fuel for a combustion system. The fuel controller also includes a purge control logic configured to control a purge sequence of mixing a purge gas with the first fuel during the fuel transition, wherein the purge sequence is configured to open a purge valve for the purge gas before fully closing a fuel valve for the first fuel.

In accordance with a third embodiment, a method includes transitioning a combustion system from a first fuel to a second fuel. The method also includes mixing a purge gas with the first fuel during the transitioning, wherein mixing includes opening a purge valve for the purge gas before fully closing a fuel valve for the first fuel.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to systems and methods for transitioning between fuel supplies for a combustion system (e.g., a gas turbine engine, combustion engine, gas-fired boiler, or furnace) with a multi-fuel system. In combustion systems with multi-fuel systems, one fuel (e.g., gas fuel) may be the primary fuel source used by the combustion system, while another fuel (e.g., liquid fuel) may be the secondary or backup fuel source for occasional use. Embodiments of the present disclosure provide a system that includes a fuel controller (e.g., turbine fuel controller) configured to control a fuel transition from the first fuel to the second fuel for the combustion system. The fuel controller includes logic (e.g., stored instructions stored on a non-transitory tangible computer readable medium) to transition between the first fuel (e.g., gas fuel) and the second fuel (e.g., liquid fuel). For example, the fuel controller may include a fuel transition logic configured control the fuel transition from the first fuel to the second fuel. Also, the fuel controller may include a purge control logic configured to control a purge sequence of mixing purge gas with the first fuel during the shutdown of the first fuel. In particular, the purge sequence may be configured to open a purge valve for the purge gas before fully closing a fuel valve for the first fuel. These systems are designed to allow for simultaneous termination and purging of the first fuel supply to avoid overheating within the combustion system by reducing the amount of unexpected fuel added to the combustion system after closure of the first fuel valve and to avoid backflow of combustion products into the fuel piping system by continuously maintaining a forward flow state.

Figure 1:
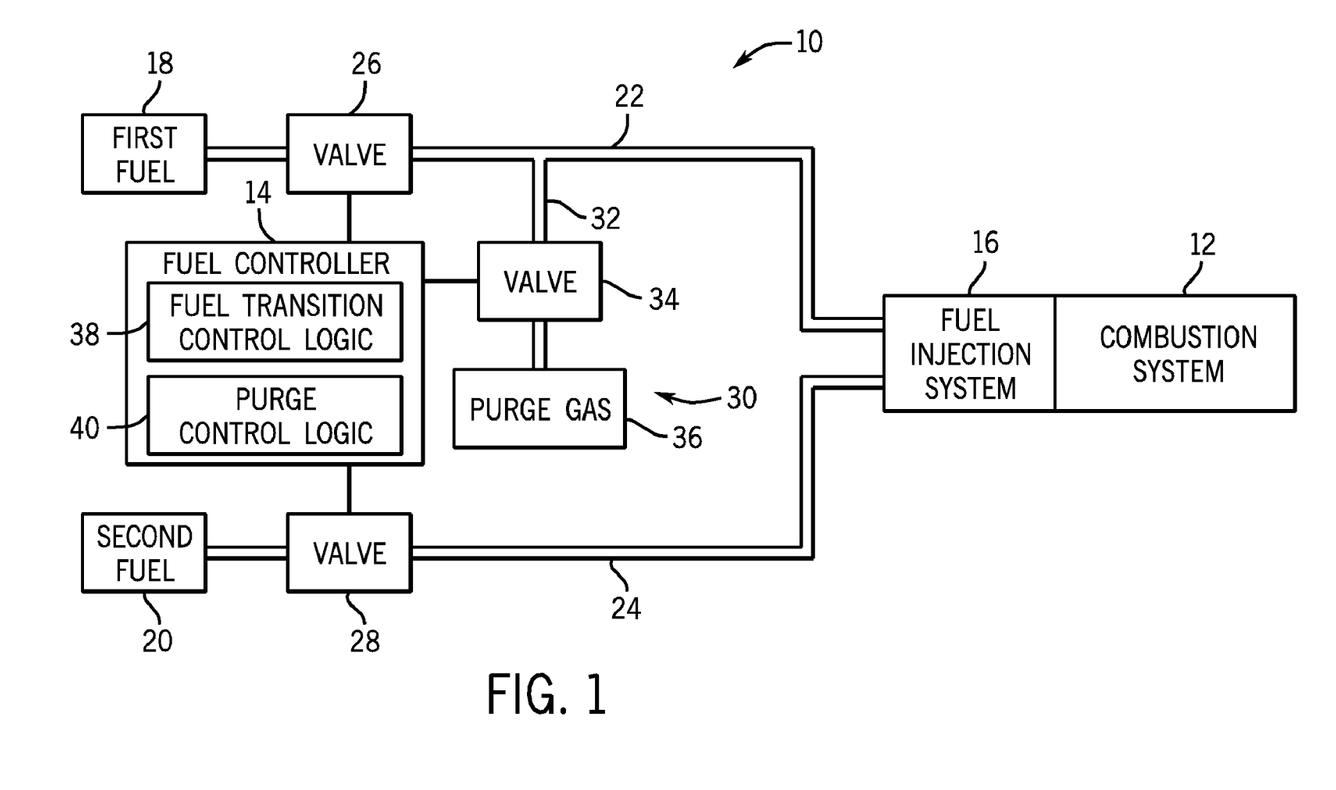
FIG. 1 is a schematic block diagram of an embodiment of a fuel management system for a combustion system.

FIG. 1 is a schematic block diagram of an embodiment of a fuel management system 10 for a combustion system 12. As described in detail below, the disclosed fuel management system 10 employs a fuel controller 14 (e.g., turbine fuel controller) to control the supply of fuel to the combustion system 12 (e.g., turbine engine or gas-fired boiler), in particular, the termination of one fuel supply and the transition to another fuel supply. The combustion system 12 may use multiple fuels, such as liquid and/or gas fuels, to feed the combustion system 12. As depicted in the combustion system 12, a fuel injection system 16 intakes a fuel supply (e.g., liquid and/or gas fuel), mixes the fuel with air, and distributes the air-fuel mixture into the combustion system 12 in a suitable ratio for optimal combustion, emissions, fuel consumption, and power output.

The fuel management system 10 provides a flow of both a first fuel 18 and a second fuel 20 to the combustion system 12 via a first fuel line 22 and a second fuel line 24. As illustrated, each fuel 18 and 20 includes a single fuel line 22 and 24 to the fuel injection system 16; however, in other embodiments, each fuel 18 and 20 may include multiple fuel lines (e.g., 2 to 28) to the fuel injection system 16. In certain embodiments, the first fuel 18 includes a gas fuel and the second fuel 20 includes a liquid fuel. In other embodiments, the first and second fuels 18 and 20 may be different gas fuels. Liquid fuel may include distillate oils, light crude, bio-liquid fuels, and other liquid fuels. Gas fuel may include natural gas and/or combustible gas(es) created as a byproduct of industrial processes which may or may not contain hydrogen gas. These combustible gases may be referred to as and include syngas, synthetic gas, synthetic natural gas, refinery off-gas, refinery flue gas, blast furnace gas, coke oven gas, or other combustible gases. Each fuel line 22 and 24 includes a respective valve 26 and 28 (e.g., fuel valves) configured to control the flow of the first and second fuels 18 and 20, respectively, to the fuel injection system 16.

As illustrated, the fuel management system 10 includes a purge system 30 (e.g., dilution purge system) configured to purge the first fuel 18 from the first fuel line 22 and the fuel injection system 16 during termination of the first fuel flow. The purge system 30 includes a purge gas line 32 coupled to the first fuel line 22 downstream of the fuel valve 26 and upstream of the fuel injection system 16. The purge gas line 32 includes a valve 34 (e.g., purge valve) configured to control the flow of a purge gas 36 through the purge gas line 32 into the first fuel line 22 to purge the first fuel 18 from the fuel line 22 and the fuel injection system 16. In certain embodiments, the purge gas 36 may include an inert purge gas 36. For example, an inert purge gas 36 may be used when the first fuel 18 has a low auto ignition temperature (e.g., fuels containing more than 5 percent hydrogen by volume) to prevent auto ignition of the fuel/purge gas mixture. The inert purge gas 36 may also be used with other types of gaseous fuels. The inert purge gas 36 may include nitrogen, carbon dioxide, argon, or helium, or in certain cases, steam. In certain embodiments, when the second fuel 20 is a gaseous fuel, the purge system 30, as described, may also be configured to control the flow of purge gas 36 into the second fuel line 24 to purge the second fuel 20 from the fuel line 24 and the fuel injection system 16.

In certain embodiments, the combustion system 12 operates on the first fuel 18 (e.g., gas fuel) as the primary fuel, and selectively operates on the second fuel 20 (e.g., liquid fuel) as a secondary fuel. The logic may be disposed on a non-transitory tangible computer readable medium. The fuel controller 14 is configured to control a supply of the first fuel (e.g., gas fuel) to the combustion system 12, a supply of the second fuel (e.g., liquid fuel) to the combustion system 12, and the transition between the use of the first and second fuels 18 and 20 for the combustion system 12. The fuel controller 14 is coupled to the fuel valves 26 and 28 for the first and second fuels 18 and 20, respectively, and the purge valve 34. In particular, the fuel controller 14 is configured to open and close valves 26, 28, and 38 to control the flow of the first fuel 18, second fuel 20, and purge gas 36.

The fuel controller 14 includes logic configured to manage the supply of the fuels 18 and 20 for the combustion system 12. For example, the fuel controller 14 includes a fuel transition control logic 38 configured to control a fuel transition from the first fuel 18 to the second fuel 20 for the combustion system 12 (e.g., gas turbine engine). The fuel controller 14 also includes a purge control logic 40 configured to control a purge sequence of mixing the purge gas 36 with the first fuel 18 (i.e., dilution purge) during fuel transition, particularly, during first fuel shutdown or termination. Mixing the purge gas 36 with the first fuel 18 during the first fuel shutdown, as opposed to after the shutdown, prevents the unscheduled addition of the first fuel 18 from the fuel line 22 to the combustion system 12 subsequent to the first fuel shutdown, as is currently the common practice, thus, preventing overheating of the system 12. In addition, the dilution purge maintains some flow through the fuel injection system 16 to prevent backflow of combustion products into the piping system (e.g., first fuel line 22) until an air purge is established to maintain the above mentioned backflow protection.

In certain embodiments, the purge sequence is configured to open the purge valve 34 for the purge gas 36 before fully closing the fuel valve 26 for the first fuel 18. In particular, the purge sequence is configured to start opening the purge valve 34 after starting to close the fuel valve 26. In some embodiments, the purge sequence is configured to start opening the purge valve 34 after a specific percent closure of the fuel valve 26 ranging from approximately 60 to 90 percent closure of the valve 26. For example, the start of the opening of the purge valve 34 may occur at approximately 60, 70, 80, or 90 percent closure of the fuel valve 26, or any other percent therebetween. Alternatively, the start of the opening the purge valve 34 may be based on the first fuel flow reaching a predetermined percentage of the total fuel required by the combustion system 12. Also, the rate of the opening the purge valve 34 may be dependent on conditions in the combustion system 12. For example, the purge sequence may be configured to increase a rate of opening of the purge valve 34 if a flame extinguishes in the combustion system 12 (e.g., gas turbine engine) to remove the backflow risk until making it acceptable to close the purge valve 34.

In some embodiments, the purge sequence includes a fuel valve closing duration of progressively closing the fuel valve 26 from an open position to a closed position, a purge valve opening duration of progressively opening the purge valve 34 from a closed position to an open position, and the fuel valve closing duration overlaps the purge valve opening duration. In certain embodiments, the purge valve opening duration completes before the fuel valve 26 reaches the closed position during the fuel valve closing duration. As above, the purge valve opening duration starts after initiation of the fuel valve closing duration. Also, as above, the purge valve opening duration starts after a specific percent closure (e.g., 70 percent) closure of the fuel valve 26 during the fuel valve closing duration. As a result of this logic, the fuel management system 10 avoids overheating within the combustion system 12 by reducing the amount of unexpected fuel added to the combustion system 12 after closure of the first fuel valve 26 and backflow of combustion products into the fuel piping system by continuously maintaining a forward flow state.

Figure 2:
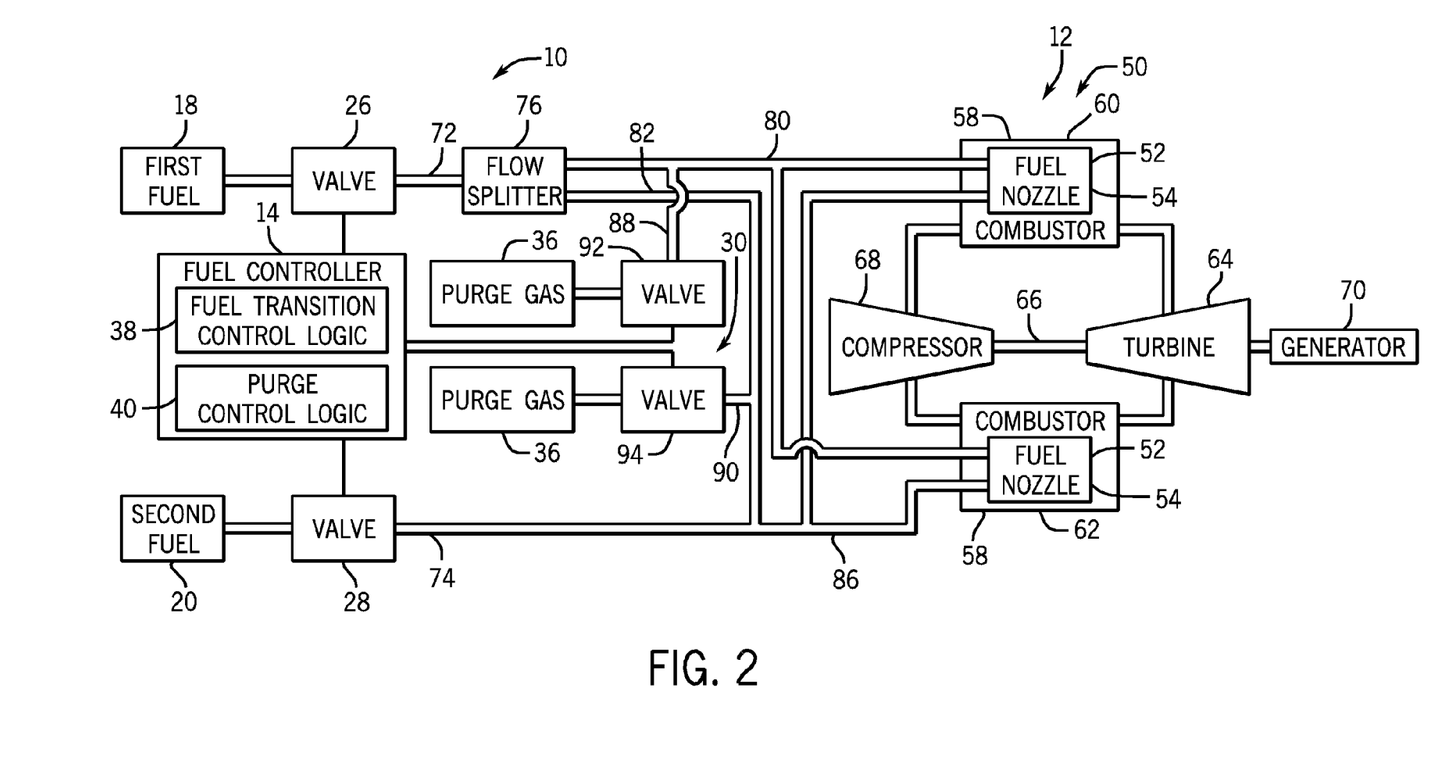
FIG. 2 is a schematic block diagram of an embodiment of a fuel management system for a turbine system.

As mentioned above, the combustion system 12 may include a turbine system 50 (e.g., gas turbine engine). FIG. 2 is a schematic block diagram of an embodiment of the fuel management system 10 for the turbine system 50, where the first fuel 18 is a gas fuel and the second fuel 20 is a gas fuel. Similar to above, the fuel management system 10 employs the fuel controller 14 (e.g., turbine fuel controller 14) to control the supply of fuel to the turbine system 50, in particular, the termination of one fuel supply and the transition to another fuel supply. Also, the turbine system 50 may use multiple fuels, as described above (e.g., multiple gas fuels) as the heat source for the turbine system 50. As depicted in the turbine system 50, one or more fuel nozzles 52 and 54 (e.g., primary fuel nozzle 52 and secondary fuel nozzle 54) intake a fuel supply (e.g., gas fuel), mix the fuel with air, and distribute the air-fuel mixture into a combustor 58 (e.g., fuel combustor 60 and fuel combustor 62) in a suitable ratio for optimal combustion, emissions, fuel consumption, and power output. In certain embodiments, each combustor 58 includes one or more primary fuel nozzles 52 and one or more secondary fuel nozzles 54. The air-fuel mixture combusts in a chamber within each combustor 58, thereby creating hot pressurized exhaust gases. Each combustor 58 directs the exhaust gases through a turbine 64 toward an exhaust outlet. As the exhaust gases pass through the turbine 64, the gases force turbine blades to rotate a shaft 66 along an axis of the turbine system 50. As illustrated, the shaft 66 may be connected to various components of the turbine system 50, including a compressor 68. The compressor 68 also includes blades coupled to the shaft 66. As the shaft 66 rotates, the blades within the compressor 68 also rotate, thereby compressing air from an air intake through the compressor 68 and into the fuel nozzles 52 and 54 and/or combustors 58. The shaft 66 may also be connected to a load, such as an electrical generator 70 in an electrical power plant, for example. The load may include any suitable device capable of being powered by the rotational mechanical power output of the turbine system 50.

The fuel management system 10 provides a flow of both the first fuel 18 (e.g., first gas fuel) and the second fuel 20 (e.g., second gas fuel) to the turbine system 50. As illustrated, each supply of fuel 18 and 20 includes a main fuel line 72 and 74, respectively. Each main fuel line 72 and 74 includes a respective valve 26 and 28 (e.g., fuel valves) configured to control the flow of the first and second fuels 18 and 20, respectively, to secondary fuel nozzles 54. The main fuel line 72 includes a flow splitter 76. For example, as illustrated, the flow splitter 76 divides the first fuel flow into first fuel lines 80 and 82. The first fuel line 80 splits to divide the flow of first fuel between the primary fuel nozzles 52. The first fuel line 82 is coupled to the main fuel line 74 downstream of the valve 28, but upstream of where the main fuel line 86 splits to provide the first fuel 18, the second fuel 20, or a combination of both the first and second fuels 18 and 20 to the fuel nozzles 54. In certain embodiments, the first fuel line 80 provides first fuel 18 (e.g., first gas fuel) to primary fuel nozzles 52, while the main fuel lines 74 and 86 provide the first fuel 18, the second fuel 20, or a combination of both the first and second fuels 18 and 20 to the secondary fuel nozzles 54.

Also, the fuel management system 10 includes the purge system 30 (e.g., dilution purge system) configured to purge the first fuel 18 from the first fuel lines 80 and 82, the main fuel lines 74 and 86, and the fuel nozzles 52 and 54 during termination of the first fuel flow. The purge system 30 includes purge gas lines 88 and 90 coupled to respective first fuel lines 80 and 82 downstream of the flow splitter 76 and upstream of the fuel nozzles 52 and 54. The purge gas lines 88 and 90 include respective valves 92 and 94 (e.g., purge valves) configured to control the flow of purge gas 36 (e.g., inert purge gas) through the lines 88 and 90 into the first fuel lines 80 and 82 to purge the first fuel 18 from the lines 80, 86, 88, and 90, and the fuel nozzles 52 and 54. As mentioned above, the inert purge gas 36 may include nitrogen, carbon dioxide, argon, or helium, or in certain cases, steam. Purge of lines 74, 82, 86, and 90 and secondary fuel nozzles 54 may not be required if the second fuel 20 has had sufficient time to displace the first fuel 18 in lines 74, 82, 86, and 90 and fuel nozzles 54 during a controlled transfer from the first fuel 18 or a combination of the first and second fuels 18 and 20 to the second fuel 20 only in lines 74, 82, 86, and 90 and fuel nozzles 54.

The fuel management system 10 includes fuel controller 14 configured to control the supply of the first fuel 18 (e.g., first gas fuel) to the turbine system 50, the supply of the second fuel 20 (e.g., second gas fuel) to the turbine system 50, and the transition between the use of the first and second fuels 18 and 20 for the turbine system 50. The fuel controller 14 is coupled to the fuel valves 26 and 28 for the first and second fuels 18 and 20, respectively, and the purge valves 92 and 94. In particular, the fuel controller 14 is configured to open and close valves 26, 28, 92, and 94 to control the flow of the first fuel 18, second fuel 20, and the purge gas 36. The fuel controller 14 includes logic, as described above, (e.g., the fuel transition control logic 38 and the purge control logic 40) configured to control the transition from the first fuel 18 to the second fuel 20, as well as to control the purge sequence of mixing purge gas 36 with the first fuel 18 (i.e., dilution purge) during a first fuel shutdown or termination. The fuel controller 14 may employ the logic and control the purge system 30 for fuel lines 74, 80, 82, and 86 simultaneously or independently. As a result of this logic, the fuel management system 10 avoids overheating within the turbine system 50 by reducing the amount of unexpected fuel added to the turbine system 50 after closure of the first fuel valve 26 and backflow of combustion products into the fuel piping system by continuously maintaining a forward flow state.

Figure 3:
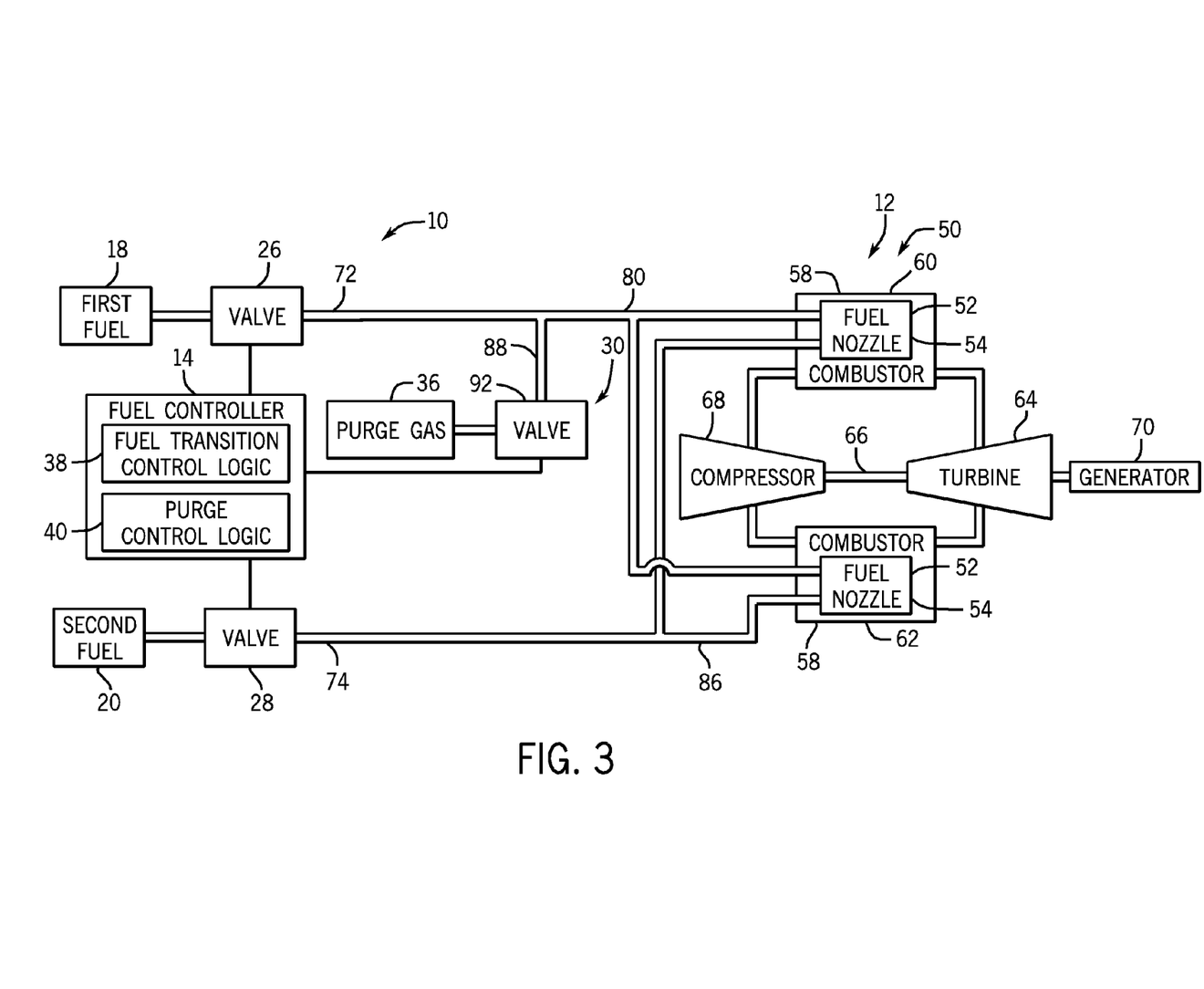
FIG. 3 is a schematic block diagram of another embodiment of a fuel management system for a turbine system.

FIG. 3 is a schematic block diagram of an embodiment of the fuel management system 10 for the turbine system 50 where the first fuel 18 includes a gas fuel and the second fuel 20 includes a liquid fuel. In general, the fuel management system 10 and the turbine system 50 are as described above in FIG. 2. The fuel management system 10 provides a flow of both the first fuel 18 (e.g., gas fuel) and the second fuel 20 (e.g., liquid fuel) to the turbine system 50. As illustrated, each supply of fuel 18 and 20 includes a main fuel line 72 and 74, respectively. Each main fuel line 72 and 74 includes a respective valve 26 and 28 (e.g., fuel valves) configured to control the flow of the first and second fuels 18 and 20, respectively, to fuel nozzles 52 and 54. As illustrated, the main fuel line 72 splits to divide the flow of the first fuel 18 to the fuel nozzles 52, while the main fuel line 74 splits to divide the flow of the second fuel 20 to the fuel nozzles 54. In certain embodiments, the number of fuel lines may vary (e.g., 2 to 28 fuel lines).

Also, the fuel management system 10 includes the purge system 30 (e.g., dilution purge system) configured to purge the first fuel 18 from the main fuel line 72 and the fuel nozzles 52 during termination of the first fuel flow. The purge system 30 includes purge gas line 88 coupled to the main fuel line 72 downstream of the valve 26 and upstream of the fuel nozzles 52 (and the split of the main fuel line 72). The purge gas line 88 includes valve 92 (e.g., purge valve) configured to control the flow of purge gas 36 (e.g., inert purge gas) through the line 88 into the fuel lines 72 and 80 to purge the first fuel 18 from the fuel lines 72 and 80 and the fuel nozzles 52. As mentioned above, the inert purge gas 36 may include nitrogen, carbon dioxide, argon, or helium, or in certain cases, steam.

The fuel management system 10 includes fuel controller 14 configured to control the supply of the first fuel 18 (e.g., gas fuel) to the turbine system 50, the supply of the second fuel 20 (e.g., liquid fuel) to the turbine system 50, and the transition between the use of the first and second fuels 18 and 20 for the turbine system 50. The fuel controller 14 is coupled to the fuel valves 26 and 28 for the first and second fuels 18 and 20, respectively, and the purge valve 92. In particular, the fuel controller 14 is configured to open and close valves 26, 28, and 92 to control the flow of the first fuel 18, second fuel 20, and the purge gas 36. The fuel controller 14 includes logic, as described above, (e.g., the fuel transition control logic 38 and the purge control logic 40) configured to control the transition from the first fuel 18 to the second fuel 20, as well as to control the purge sequence of mixing purge gas 36 with the first fuel 18 (i.e., dilution purge) during a first fuel shutdown or termination. As a result of this logic, the fuel management system 10 avoids overheating within the turbine system 50 by reducing the amount of unexpected fuel added to the turbine system 50 after closure of the first fuel valve 26 and backflow of combustion products into the fuel piping system by continuously maintaining a forward flow state.

Figure 4:
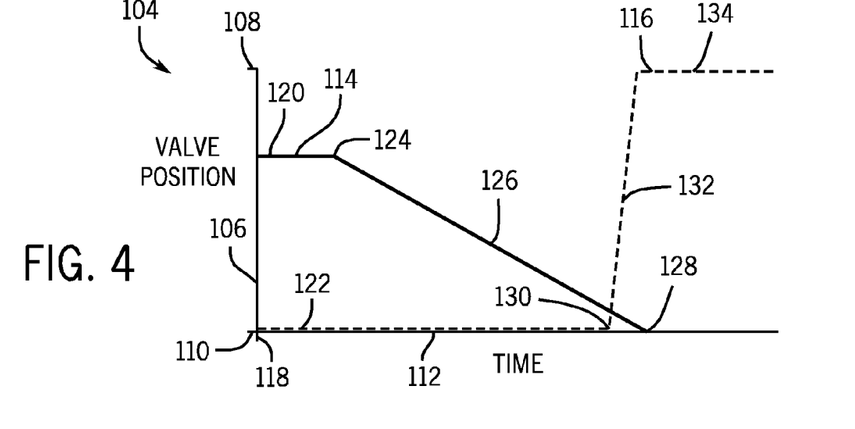
FIG. 4 is a graphical representation of an embodiment of a purge sequence illustrating an opening and closing of a fuel valve and a purge valve.

FIG. 4 is a graphical representation 104 of an embodiment of the purge sequence described above, illustrating an opening and closing of the first fuel valve 26 and the purge valve 34. The graph 104 includes a vertical axis 106 representing the valve position of the fuel valve 26 and the purge valve 34. A top 108 of the vertical axis 106 represents a fully opened valve position and a bottom 110 of the vertical axis 106 represents a fully closed valve position. The graph 104 also includes a horizontal axis 112 representing time. Time increases from left to right along the horizontal axis 112. The graph 104 includes a plot 114, illustrated by a solid line, representing the valve position of the first fuel valve 26 (e.g., gas fuel valve) and a plot 116, illustrated by a dashed line, representing the valve position of the purge valve 34.

As described above, the fuel controller 14 is coupled to both the first fuel valve 26 and the purge valve 34 and includes the purge control logic 40 configured to control the purge sequence. At a time 118, the fuel valve 26 maintains a substantially opened position as indicated by region 120 of the plot 114 and the purge valve 34 maintains a fully closed position indicated by region 122 of the plot 116. At time 124, the controller 14 initiates the purge sequence and commences a fuel valve closing duration, represented by region 126 of plot 114, of progressively closing the fuel valve 26 from the open position 120 to a closed position 128. The fuel valve closing duration depends on the size of fuel gas valve 26. The closing of the fuel gas valve 26 may range from approximately 15 seconds to approximately 3 minutes. For example, the fuel valve closing duration may lasts approximately 15, 30, 45, 60, 75, 90, 105, 120, 135, 150, 175, or 180 seconds, or any time therebetween. At time 130, the controller 14 initiates a purge valve opening duration, represented by region 132 of plot 116, of progressively opening the purge valve 36 from the closed position 122 to an open position 134. The purge valve opening duration 132 is shorter than the fuel valve closing duration 132, since the purge valve 34 may be smaller than the fuel valve 26. As illustrated, the purge valve opening duration 132 starts after initiation 124 of the fuel valve closing duration 126 and overlaps the fuel valve closing duration 126. In the illustrated embodiment, the purge valve opening duration 132 completes (i.e., the purge valve 34 reaches a fully open position, represented by region 134 of the plot 116) during the fuel valve closing duration 126. As mentioned above, the purge valve opening duration 132 may start after a certain percent closure (e.g., approximately 70 percent closure) of the fuel valve 26 during the fuel valve closing duration 126. In some embodiments, the specific percent closure of the fuel valve 26 during the fuel valve closing duration to trigger the start of the purge valve opening duration may range from approximately 60 to 90 percent closure of the valve 26. For example, the purge valve opening duration 132 may occur at approximately 60, 70, 80, or 90 percent closure of the fuel valve 26, or any other percent therebetween. Alternatively, the purge valve opening duration 132 may start after flow of the first fuel 18 (e.g., gas fuel) reaches a threshold flow rate. As illustrated, the purge sequence avoids overheating within the combustion system 12 by reducing the amount of unexpected fuel added to the combustion system 12 after closure of the first fuel valve 26 and backflow of combustion products into the fuel piping system by continuously maintaining a forward flow state.

Figure 5:
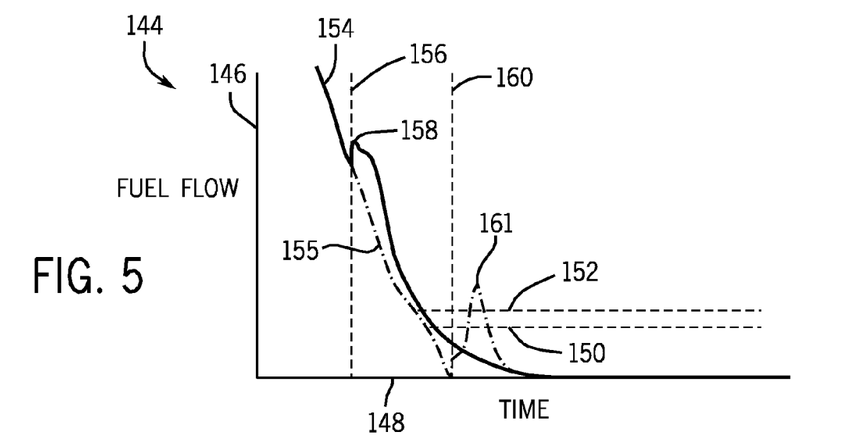
FIG. 5 is a graphical representation of an embodiment of a fuel flow during the purge sequence.

As mentioned above, initiating the opening of the purge valve 34 prior to closing the first fuel valve 26 (e.g., gas fuel valve) avoids overheating within the combustion system 12 by reducing the amount of unexpected fuel added to the combustion system 12 after closure of the first fuel valve 26. FIG. 5 is a graphical representation 144 of an embodiment of a fuel flow (e.g., gas fuel flow) during the purge sequence described above. The graph 144 includes a vertical axis 146 representing fuel flow of first fuel 18 (e.g., gas fuel). Fuel flow increases from the bottom to the top along the vertical axis 146. The graph 144 also includes a horizontal axis 148 representing time. Time increases from left to right along the horizontal axis 148. The graph 148 further includes a dashed line 150 representing an overtemperature alarm limit for an engine (e.g., gas turbine engine) based off of combustion temperature, engine exhaust temperature, or additional power production due to unscheduled fuel addition and correlated to the fuel flow. Further, the graph 144 includes a dashed line 152 representing an overtemperature trip limit for the engine based off of combustion temperature, engine exhaust temperature, or additional power production due to unscheduled fuel addition and correlated to the fuel flow. The graph 144 yet further includes a plot 154 representing the fuel flow over time including in the presence of the purge sequence. The graph 148 also includes a plot 155 representing the fuel flow over time in the absence of the purge sequence.

Plot 154 illustrates the fuel flow decreasing during the fuel valve closing duration described above. Initiation of the opening of the purge valve 34, indicated by reference numeral 156, results in a small peak 158 in fuel flow at the combustion system 12. This occurs due to the purge gas 36 displacing the first fuel 18 (e.g., gas fuel) temporarily causing a greater fuel flow into the combustion system 12. While flow of the purge gas 36 increases and the fuel flow of the first fuel 18 gradually decreases, the first fuel valve 26 eventually fully closes as indicated by reference numeral 160. As illustrated, the closing 160 of the first fuel valve 26 does not cause a spike in the fuel flow rate that would result in an unexpected amount of first fuel 18 in the combustion system 12 and consequentially overheating within the engine. In particular, the fuel flow does not increase to a level to trigger the overtemperature alarm limit 150 and the overtemperature alarm limit 152. In contrast, upon closing 160 of the fuel valve 26 in the absence of the purge sequence, the fuel flow may spike, as indicated by peak 161 of plot 155, and trip the alarm limits 150 and 152 due to the unexpected addition of fuel to the combustion system 12 after closure of the valve 26. Thus, the purge sequence as described above avoids the delivery of unexpected fuel to the engine that may result in overheating and damage to equipment.

Figure 6:
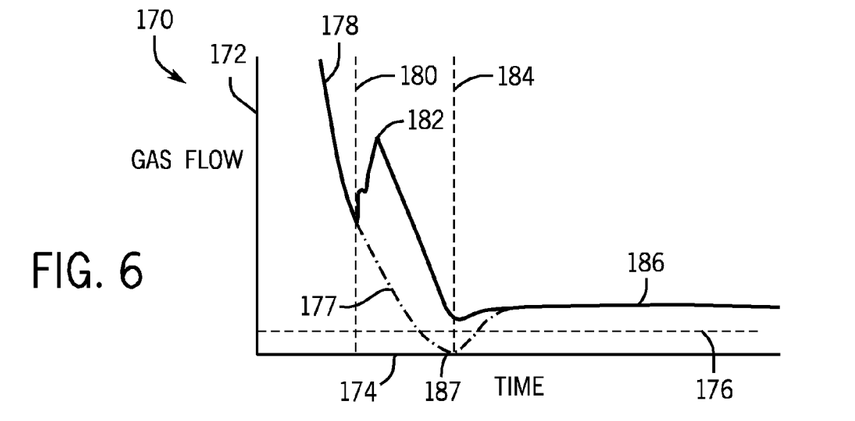
FIG. 6 is a graphical representation of an embodiment of a gas flow during the purge sequence.

Also, as mentioned above, initiating the opening of the purge valve 34 prior to closing the first fuel valve 26 (e.g., gas fuel valve) maintains some flow through the fuel injection system 16 after fuel valve 26 closes preventing backflow of combustion products into the fuel piping system. FIG. 6 is a graphical representation 170 of an embodiment of a gas flow during the purge sequence described above. The graph 170 includes a vertical axis 172 representing gas flow (e.g., through a fuel nozzle) of the first fuel 18 and purge gas 36. Gas flow increases from the bottom to the top along the vertical axis 172. The graph 170 also includes a horizontal axis 174 representing time. Time increases from left to right along the horizontal axis 174. The graph 170 further includes a dashed line 176 representing the minimum gas flow rate to prevent back flow, for example, into the fuel nozzle and fuel piping system. The graph 170 also includes plot 177 representing the gas flow over time in the absence of the purge sequence.

Plot 178 illustrates the gas flow decreasing during the fuel valve closing duration and the purge valve opening duration as described above. Prior to initiation of the opening of the purge valve 34 as indicated by reference numeral 180, the gas flow consists entirely of the flow of the first fuel 18 (e.g., gas fuel). After opening 180 the purge valve 34, a small peak 182 in gas flow occurs due to the purge gas 36 supplementing the first fuel 18 temporarily causing a greater overall gas flow. The gas flow from the opening 180 of the purge valve 34 to the closing of the first fuel valve 26 (e.g., gas fuel valve), indicated by reference numeral 184, represents both the first fuel flow and the purge gas flow. As illustrated, the gas flow gradually decreases until the closing 184 of the first fuel valve 26. At the closing 184 of the first fuel valve 26, some gas flow (i.e., mostly purge gas flow), indicated by region 186 of the plot 178, still occurs above the minimum gas flow rate 176 to prevent back flow into the fuel nozzle and the fuel piping system that may result in damage to equipment. In contrast, upon closing 184 of the fuel valve 26 in the absence of the purge sequence, the gas flow may fall below the minimum gas flow rate 176, as indicated by region 187 of the plot 177, potentially resulting in the backflow of combustion products into the fuel piping system. Thus, the purge gas flow supplements the first fuel flow during the fuel valve closing duration to maintain the gas flow above the minimum gas flow rate, and then continues after the closing 184 of the first fuel valve 26.

Figure 7:
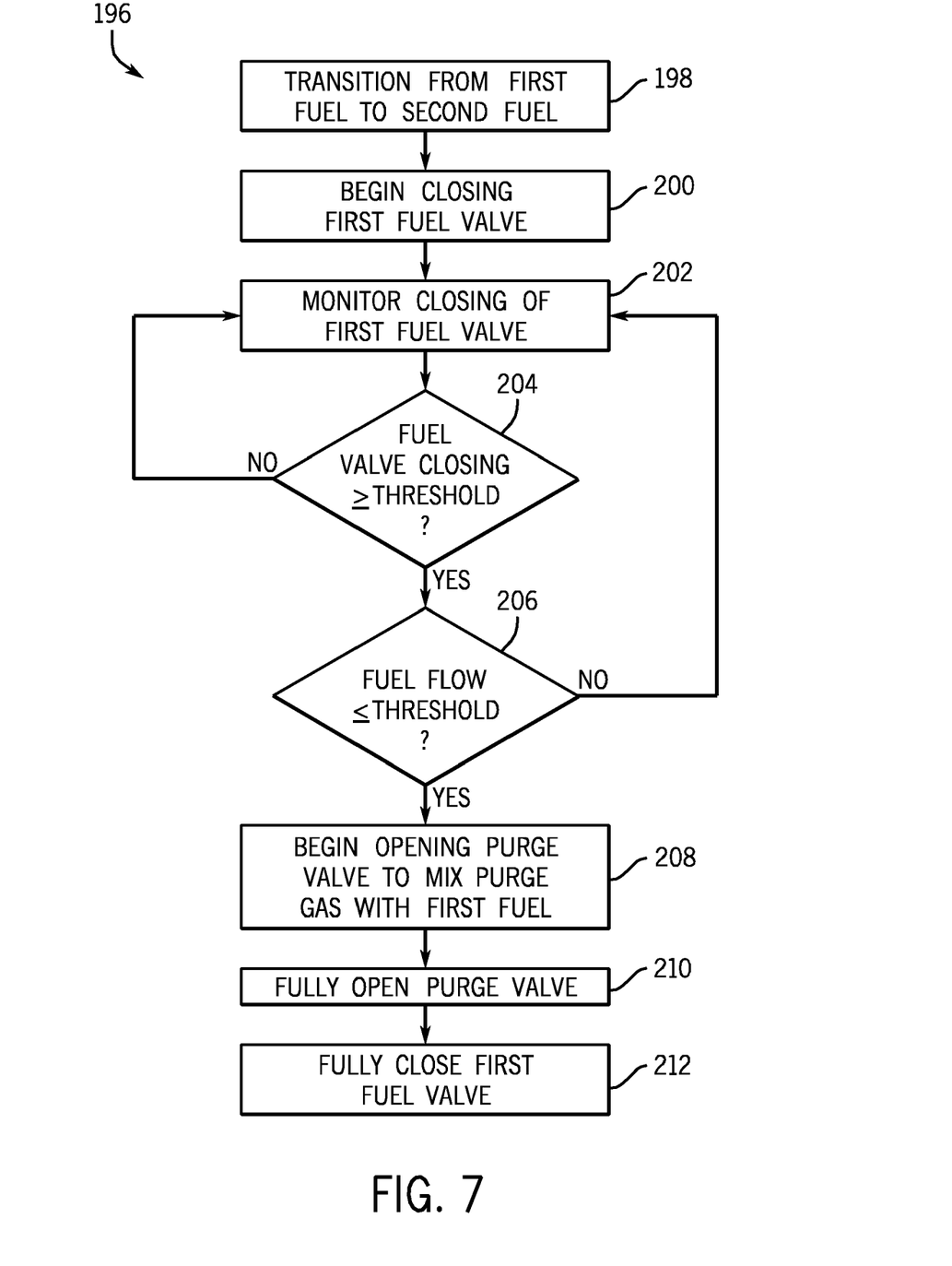
FIG. 7 is a flow chart of an embodiment of a process for purging a fuel from a fuel line.

Employment of the above embodiments of the fuel management system 10, referenced in FIGS. 1, 2, and 3, are described in the following process. FIG. 7 is a sequence flow chart of an embodiment of a process 196 for purging the first fuel 18 (e.g., gas fuel) from the first fuel line. In particular, the process 196 employs the purge sequence described above to avoid overheating within the combustion system 12 and backflow of combustion products into the fuel piping system. The fuel controller 14, as described above, implements the process 196.

The process 196 includes initiating a transition from the first fuel 18 (e.g., gas fuel) to the second fuel 20 (e.g., liquid fuel) (block 198). Indeed, the transition includes beginning the closing of the first fuel valve 26 (block 200). The controller 14 monitors the closing of the first fuel valve 26 by monitoring one or more parameters (block 202). The parameters monitored by the controller 14 include percent closure of the fuel valve 26, first fuel flow rate, temperature of the combustion system 12, and/or other parameters. The controller 14 may monitor one or more of these parameters. In particular, the controller 14 may inquire if the fuel valve closing is equal to or greater than a threshold percentage (e.g., approximately 70 percent) for closure of the fuel valve 26 (block 204). In some embodiments, the threshold percentage for closure of the fuel valve 26 may range from approximately 60 to 90 percent closure of the valve 26. For example, the threshold percentage may be approximately 60, 70, 80, or 90 percent closure of the fuel valve 26, or any other percent therebetween. If the percent fuel valve closure remains below the threshold percentage, the controller 14 continues to monitor the closing of the first fuel valve 26 (block 202). However, if the percent fuel valve closure equals or surpasses the threshold percentage for closure of the fuel valve 26, then the controller 14 may also inquire if the fuel flow of the first fuel 18 falls below a desired threshold for the fuel flow (block 206). If the fuel flow remains above the fuel flow threshold, the controller 14 continues to monitor the closing of the first fuel valve (block 202). However, if the fuel flow equals or falls below the fuel flow threshold, the controller 14 begins opening the purge valve 34 to mix purge gas 36 with the first fuel 18 (block 208).

Eventually, after the beginning of the opening of the purge valve (block 208), the controller 14 gradually opens the purge valve 34 to a fully opened position (block 210). As mentioned above, the rate of opening the purge valve may increase if a flame extinguishes (e.g., mechanical trip) in the combustion system 12 in order to maintain some gas flow into the system 12 and to avoid hardware damage. After fully opening the purge valve 34, eventually the controller 14 fully closes the fuel valve 26 for the first fuel 18. The process 196 enables the fuel management system 10 to avoid overheating within the combustion system 12 by reducing the amount of unexpected fuel added to the combustion system 12 after closure of the first fuel valve 26 and blocking backflow of combustion products into the fuel piping system by continuously maintaining a forward flow state.

Technical effects of the disclosed embodiments include providing systems and methods to control the supply and transition between fuels (e.g., gas and liquid fuels) to a combustion system 12 to block backflow of combustion products, prevent temperature spikes due to fuel surges, emission spikes due to fuel surges, and other undesirable results of the transition. Controller 14 includes various logic (e.g., instructions stored on a non-transitory tangible computer readable medium) to control the transition from the first fuel 18 (e.g., gas fuel) to the second fuel 20 (e.g., liquid fuel). In particular, controller 14 includes logic to control a purge sequence configured to open the purge valve 34 before fully closing the first fuel valve 26 to allow the mixing of a purge gas with the first fuel 18 during the fuel transition. The disclosed embodiments may avoid overheating within the combustion system 12 by preventing unexpected first fuel flow into the system 12. In addition, the disclosed embodiments may avoid backflow of combustion products into the fuel piping by maintaining some forward flow through the piping. As a result, damage may be avoided to equipment due to the overheating or the backflow of combustion products.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a turbine fuel controller, comprising:
a purge control logic configured to control a purge sequence of mixing a purge gas with a first fuel during a first fuel shutdown, wherein the purge sequence is configured to open a purge valve for the purge gas before fully closing a fuel valve for the first fuel.

2. The system of claim 1, wherein the purge sequence is configured to fully open the purge valve before fully closing the fuel valve.

3. The system of claim 1, wherein the purge sequence is configured to start opening the purge valve after starting to close the fuel valve.

4. The system of claim 3, wherein the purge sequence is configured to start opening the purge valve after closing of the fuel valve is equal to or greater than a fuel valve closing threshold percentage.

5. The system of claim 1, wherein the purge sequence is configured to increase a rate of opening the purge valve if a flame extinguishes in a gas turbine engine.

6. The system of claim 1, comprising a gas turbine engine having the turbine fuel controller.

7. The system of claim 1, wherein the turbine fuel controller comprises a fuel transition control logic configured to control a fuel transition from the first fuel to a second fuel for a gas turbine engine.

8. A system, comprising:
a fuel controller, comprising:
a fuel transition control logic configured to control a fuel transition from a first fuel to a second fuel for a combustion system; and
a purge control logic configured to control a purge sequence of mixing a purge gas with the first fuel during the fuel transition, wherein the purge sequence is configured to open a purge valve for the purge gas before fully closing a fuel valve for the first fuel.

9. The system of claim 8, wherein the purge sequence comprises a fuel valve closing duration of progressively closing the fuel valve from a first open position to a first closed position, the purge sequence comprises a purge valve opening duration of progressively opening the purge valve from a second closed position to a second open position, and the fuel valve closing duration overlaps the purge valve opening duration.

10. The system of claim 9, wherein the purge valve opening duration completes before the fuel valve reaches the first closed position during the fuel valve closing duration.

11. The system of claim 9, wherein the purge valve opening duration starts after initiation of the fuel valve closing duration.

12. The system of claim 11, wherein the purge valve opening duration starts after approximately 70 percent closure of the fuel valve during the fuel valve closing duration.

13. The system of claim 9, wherein a rate of opening the purge valve increases during the purge valve opening duration if a flame extinguishes in the combustion system.

14. The system of claim 8, comprising the combustion system having the fuel controller.

15. The system of claim 14, wherein the combustion system comprises a gas turbine engine.

16. The system of claim 8, wherein the first fuel is a gas fuel and the second fuel is a liquid fuel, or both the first and second fuels are gas fuels.

17. The system of claim 8, wherein the purge gas comprises nitrogen, carbon dioxide, argon, helium, or steam.

18. A method, comprising:
transitioning a combustion system from a first fuel to a second fuel; and
mixing a purge gas with the first fuel during the transitioning, wherein mixing comprises opening a purge valve for the purge gas before fully closing a fuel valve for the first fuel.

19. The method of claim 18, wherein opening the purge valve comprises fully opening the purge valve before fully closing the fuel valve.

20. The method of claim 18, wherein opening the purge valve comprises starting to open the purge valve after closing of the fuel valve is equal to or greater than a fuel valve closing threshold percentage.

* * * * *